J. H. K. MILLER.
DEVICE FOR AUGMENTING THE HEATING OF LIQUIDS IN KETTLES AND OTHER VESSELS.
APPLICATION FILED AUG. 21, 1917.
1,254,523. Patented Jan. 22, 1918.
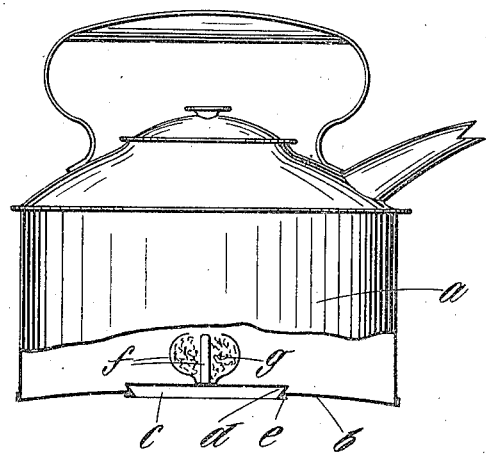
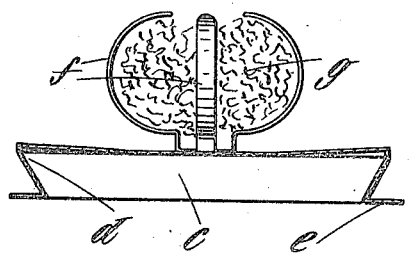
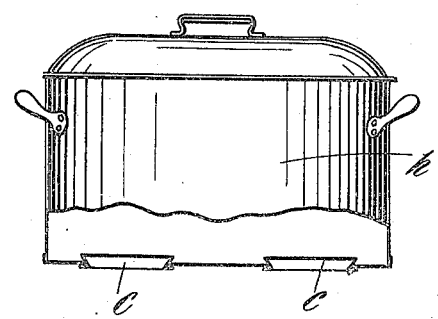
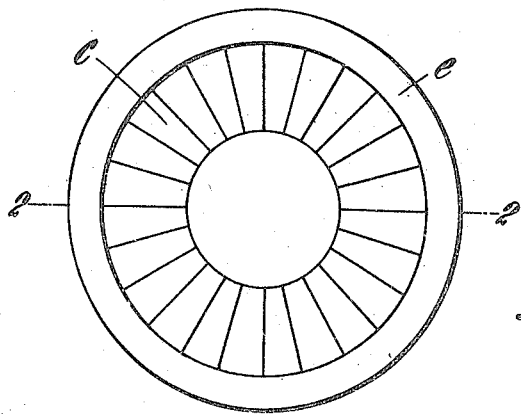
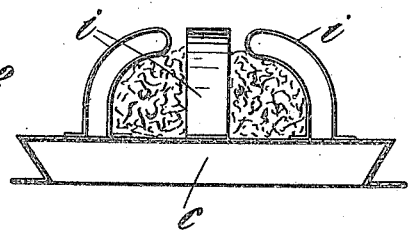
INVENTOR
J. H. K. MILLER
BY: [signature]
ATTORNEY.

UNITED STATES PATENT OFFICE.

JOHN HENRY KEELEY MILLER, OF WANDSWORTH, LONDON, ENGLAND.

DEVICE FOR AUGMENTING THE HEATING OF LIQUIDS IN KETTLES AND OTHER VESSELS.

1,254,523.    Specification of Letters Patent.    Patented Jan. 22, 1918.

Application filed August 21, 1917.   Serial No. 187,480.

*To all whom it may concern:*

Be it known that I, JOHN HENRY KEELEY MILLER, a citizen of the United Kingdom of Great Britain and Ireland, and resident of 49 Tonsley Hill, Wandsworth, London, S. W., England, have invented a certain new and useful Device for Augmenting the Heating of Liquids in Kettles and other Vessels, of which the following is a specification, such as will enable others skilled in the art to which it appertain to make and use the same.

This invention relates to improvements in and connected with kettles, boilers and other containers for heating liquids and is designed for the purpose of facilitating or expediting the heating.

The invention can be applied to all ordinary containers such as those having flat bottoms, concave bottoms or those of the well type.

The invention refers particularly to that class of vessels in which one or more concave or otherwise inwardly projecting dishes or disks of metal of good conductivity are let or inset into the bottom of the vessel and also to that type in which projections of metal extend from the bottom inwardly for the purpose of conducting the heat to the contents of the vessel.

According to the present invention I use one or more of the said dishes or disks of metal and I attach to it or them inwardly projecting pieces said inset pieces being of what I may call shallow hat-shape with the sides sloped outwardly from the brim portion so that an undercut section is obtained. The center part is preferably ribbed, say radially and the inwardly projecting pieces are preferably shaped in the form of claws or holders in which a fur-collecting material can be held.

Examples of my invention are shown in the accompanying drawings in which—

Figure 1 illustrates a kettle to which the invention is applied.

Fig. 2 shows the appliance on an enlarged scale and

Fig. 3 is a plan or underside view of the appliance as shown in Fig. 2. In this form the kettle $a$ has an opening into which the appliance is fitted and secured as by soldering or in other suitable manner. The appliance comprises a main or body part $c$ having a radially corrugated top and provided with rim $e$. The sides $d$ of this part are sloped outwardly so as to form an acute angled corner for the purpose of retaining heat. A fur-collector comprising claws $f$ is secured centrally to the part $e$ and holds suitable substance such as loofa, sponge or the like. The claws are raised from the bottom so as not to interfere with heat rising through the water.

Fig. 4 shows a boiler with two inset parts.

Fig. 5 shows a modification in which the inset part $c$ has looped claws or holders $i$, for holding the loofa or other material. These claws as well as those of Fig. 2 may advantageously be made of copper so as to enhance the heating qualities of the appliance.

It must be understood that any known or other suitable form of auxiliary heat conveying device may be employed in conjunction with the inset part such for example, as strips of copper, rivet-like bars or pieces, etc., carried through the appliance.

What I claim and desire to secure by Letters Patent is:—

1. A vessel for heating liquids, comprising a hollow body of sheet metal and heat-conducting means consisting of a claw within the body and secured to the bottom thereof.

2. A vessel for heating liquids, comprising a hollow body of sheet metal, an inset piece fitted into the bottom thereof, and heat conducting means consisting of a claw within the body and secured to the inset piece.

3. A vessel for heating liquids, comprising a hollow body of sheet metal, heat-conducting means consisting of a claw within the body and secured to the bottom thereof, and a device, held in position by the claw, for collecting fur or lime from liquid placed in the vessel.

4. A vessel for heating liquids, comprising a hollow body of sheet metal, heat-conducting means consisting of a plurality of inwardly turned claws within the body and secured to the bottom thereof, and a device, fitted between the inwardly-turned claws, for collecting fur or lime from liquid placed in the vessel.

5. A vessel for heating liquids comprising a body of sheet metal having a bottom in which is inset a recessed sheet metal portion carrying a device for collecting fur or lime from liquids placed in the vessel.

6. A vessel for heating liquids comprising a body of sheet metal having an inset piece in its bottom carrying a device for collecting fur or lime from liquids placed in the vessel, said device acting also as a heat conductor.

7. A vessel for heating liquids comprising a body having an inset portion in its bottom the inside of which has a plurality of curved metal strips the ends of which are directed toward each other and within which a fur or lime collecting material is placed.

8. A vessel for liquids comprising a body portion, an inset portion in the bottom thereof the sides of which are inclined outwardly so as to form an acute angle, and a fur collecting device attached to the inset portion on the inside of the vessel.

9. A kettle for domestic use made of sheet metal, in the bottom of which is inserted a metal portion of greater heat conductivity than the rest of the kettle, said inset portion having attached to it a fur or lime collecting device.

10. A kettle for domestic purposes having a bottom in which is a metal inset having attached to it heat conducting devices and fur collecting material such as loofa.

In witness whereof I have hereunto set my hand in presence of a witness.

JOHN HENRY KEELEY MILLER.

Witness:
HENRY FAIRBROTHER.

Copies of this patent may be obtained for five cents each, by addressing the "Commissioner of Patents, Washington, D. C."